(12) United States Patent
Serena

(10) Patent No.: US 10,210,268 B2
(45) Date of Patent: Feb. 19, 2019

(54) RELATIONSHIP NETWORKS HAVING LINK QUALITY METRICS WITH INFERENCE AND CONCOMITANT DIGITAL VALUE EXCHANGE

(71) Applicant: F. David Serena, Camarillo, CA (US)

(72) Inventor: F. David Serena, Camarillo, CA (US)

( * ) Notice: Subject to any disclaimer, the term of this patent is extended or adjusted under 35 U.S.C. 154(b) by 333 days.

(21) Appl. No.: 15/256,723

(22) Filed: Sep. 5, 2016

(65) Prior Publication Data

US 2016/0371387 A1  Dec. 22, 2016

Related U.S. Application Data

(63) Continuation of application No. 14/275,328, filed on May 12, 2014, now Pat. No. 9,438,650, which is a
(Continued)

(51) Int. Cl.
  *G06F 15/16* (2006.01)
  *G06F 17/30* (2006.01)
  (Continued)

(52) U.S. Cl.
  CPC ...... *G06F 17/30867* (2013.01); *G06F 3/0481* (2013.01); *G06F 3/04842* (2013.01);
  (Continued)

(58) Field of Classification Search
  CPC ......... G06F 17/30867; G06F 17/30598; G06F 17/30958; G06F 3/0481; G06F 3/04842;
  (Continued)

(56) References Cited

U.S. PATENT DOCUMENTS 7,177,880 B2  2/2007  Ruvolo et al.
7,188,153 B2  3/2007  Lunt et al.
(Continued)

FOREIGN PATENT DOCUMENTS

KR  10-2010-0130003  12/2010
WO  WO 2010-048172  4/2010

OTHER PUBLICATIONS

Outlook Blog, "Announcing the Outlook Social Connector," http://blogs.office.com/b/microsoft-outlook/archive/2009/11/18/announcing-the-outlook-social-connector.aspx, Jul. 3, 2.
(Continued)

*Primary Examiner* — Kristie D Shingles
(74) *Attorney, Agent, or Firm* — Browdy and Neimark, P.L.L.C.

(57) ABSTRACT

In a digital social relationship network, a social network server computer stores a digital social network representation corresponding to a graph having nodes representing individuals or groups and links representing actual social relationships between the individuals or groups. The server computer obtains relationship-dependent information corresponding to a plurality of links of the graph, and embeds the relationship-dependent information in the digital social network representation stored in the social network server computer. The server computer interactively presents to a user of a client computer connected to the social network server computer a social network of the individuals or groups and the social relationships between the individuals or groups. The social network server computer receives input from the user of the client computer selecting at least one of the social relationships between individuals or groups other than the user, and presents to the user of the client computer a social relationship profile comprising the relationship-dependent information corresponding to the social relationship selected by the user of the client computer. The
(Continued)

server computer facilitates exchange of digital value to the user of the client computer, or a group to which the user of the client computer belongs, based on the relationship-dependent information embedded in the digital social network representation stored in the social network server computer.

36 Claims, 9 Drawing Sheets

Related U.S. Application Data continuation of application No. 13/177,856, filed on Jul. 7, 2011, now Pat. No. 8,725,796.

(51) Int. Cl.
G06Q 10/10 (2012.01)
G06Q 50/00 (2012.01)
G06F 3/0481 (2013.01)
G06F 3/0484 (2013.01)
H04L 29/06 (2006.01)
G06F 21/10 (2013.01)
H04L 29/08 (2006.01)

(52) U.S. Cl.
CPC .. *G06F 17/30598* (2013.01); *G06F 17/30958* (2013.01); *G06F 21/10* (2013.01); *G06Q 10/10* (2013.01); *G06Q 50/01* (2013.01); *H04L 65/403* (2013.01); *H04L 67/10* (2013.01); *G06F 2221/0713* (2013.01)

(58) Field of Classification Search
CPC ........ G06F 21/10; G06Q 10/10; G06Q 50/01; H04L 65/403; H04L 67/10
USPC ........................................................ 709/203
See application file for complete search history.

(56) References Cited

U.S. PATENT DOCUMENTS

| | | | |
|---|---|---|---|
| 7,469,232 B2 | 12/2008 | Read | |
| 7,472,110 B2 | 12/2008 | Achlioptas | |
| 7,539,697 B1 | 5/2009 | Akella et al. | |
| 7,596,597 B2 | 9/2009 | Liu et al. | |
| 7,610,367 B2 | 10/2009 | Canright et al. | |
| 7,669,123 B2 | 2/2010 | Zuckerberg et al. | |
| 7,680,882 B2 | 3/2010 | Tiu et al. | |
| 7,716,300 B2 | 5/2010 | Kott et al. | |
| 7,797,256 B2 | 9/2010 | Zuckerberg et al. | |
| 7,801,971 B1 | 9/2010 | Amidon et al. | |
| 7,822,739 B2 | 10/2010 | Srikanth et al. | |
| 7,853,622 B1 | 12/2010 | Baluja et al. | |
| 7,865,551 B2 | 1/2011 | McCuller | |
| 7,865,592 B2 | 1/2011 | Chakra et al. | |
| 8,015,119 B2 | 9/2011 | Buyukkokten et al. | |
| 8,086,605 B2 | 12/2011 | Xu et al. | |
| 8,090,665 B2 | 1/2012 | Yang et al. | |
| 8,176,191 B2 | 5/2012 | Fischer et al. | |
| 8,214,300 B2 | 7/2012 | Gottsman | |
| 8,228,821 B2 | 7/2012 | Robinson et al. | |
| 8,271,516 B2 | 9/2012 | Gounares et al. | |
| 8,312,276 B2 | 11/2012 | Chiou et al. | |
| 8,359,276 B2 | 1/2013 | Zhuang et al. | |
| 8,504,559 B1 | 8/2013 | Elman et al. | |
| 8,572,129 B1 | 10/2013 | Lee et al. | |
| 8,725,796 B2 * | 5/2014 | Serena ................... | G06Q 10/10 709/203 |
| 2004/0122803 A1 | 6/2004 | Dom et al. | |
| 2005/0193054 A1 | 9/2005 | Wilson et al. | |
| 2005/0197846 A1 | 9/2005 | Pezaris et al. | |
| 2006/0047725 A1 | 3/2006 | Bramson | |
| 2006/0080613 A1 | 4/2006 | Savant | |
| 2007/0281690 A1 | 12/2007 | Altman et al. | |
| 2007/0282887 A1 | 12/2007 | Fischer et al. | |
| 2008/0013701 A1 | 1/2008 | Barhydt et al. | |
| 2008/0086458 A1 | 4/2008 | Robinson et al. | |
| 2008/0117202 A1 | 5/2008 | Martinez et al. | |
| 2008/0120411 A1 | 5/2008 | Eberle | |
| 2008/0130522 A1 | 6/2008 | Pennington et al. | |
| 2008/0243628 A1 | 10/2008 | Wiseman et al. | |
| 2008/0270908 A1 | 10/2008 | Hope et al. | |
| 2009/0307057 A1 | 12/2009 | Azout et al. | |
| 2009/0307073 A1 | 12/2009 | MirrokniBanadaki et al. | |
| 2010/0070485 A1 | 3/2010 | Parsons et al. | |
| 2010/0082667 A1 | 4/2010 | Callanan et al. | |
| 2010/0082695 A1 | 4/2010 | Hardt et al. | |
| 2010/0145771 A1 | 6/2010 | Fligler et al. | |
| 2010/0228614 A1 | 9/2010 | Zhang et al. | |
| 2011/0022529 A1 | 1/2011 | Barsoba et al. | |
| 2011/0038512 A1 | 2/2011 | Petrou et al. | |
| 2012/0266081 A1 | 10/2012 | Kao | |

OTHER PUBLICATIONS

Take-Two Interactive Software, Sid Meier's Civilization IV manual, pp. 99-104 ("Diplomacy"), 2005.
33bits.org, "Google+ and Privacy: A Roundup," http://33bits.org/2011/07/03/google-and-privacy-a-roundup, Jul. 3, 2011.
Wikipedia, "Maximum Flow Problem," http://en.wikipedia.org/wiki/Maximum_flow_problem, Mar. 15, 2010.
Agarwal, Amit; "Find What's Common Between Two Facebook Users"; Nov. 4, 2010; Digital Inspiration.
Bellm, Eric; "Visualizing Social Networks"; Jun. 3, 2011; bellm.org.
Imam, Ali; "Visualize Your LinkedIn Network with InMaps"; Jan. 24, 2011; LinkedIn.
Kao, Wayne; "Telling the Story of Friendships"; Nov. 1, 2010; Facebook.
Newman, Jared; "Facebook Friendship Pags: Coll but Creepy"; Nov. 1, 2010; PC World.
Odden, Lee; "6 Facebook Search Engine & Visualization Tools"; Aug. 16, 2010; TopRank.
Schroeder, Stan; "6 Gorgeous Facebook Visualizations"; Aug. 22, 2009; Mashable.
TouchGraph, LLC; "TouchGraph Facebook Browser"; Aug. 21, 2007; Visual Complexity.
Van Grove, Jennifer; "Facebook Now Tries to Tell the Story Between Two Friends"; Oct. 30, 2010; Mashable.

* cited by examiner

System Overview Diagram. Figure 1.

Graph
Representation of
Social Networks
and Networks of
Relationships
Figure 2.
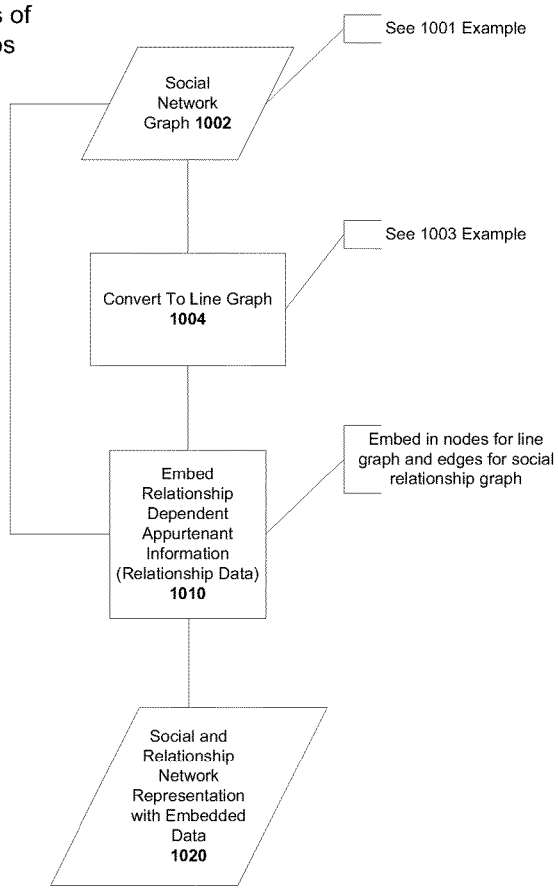
Example Undirected
Social Relationship
Graph 1001
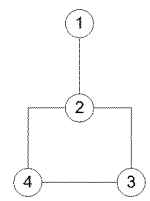
Example
Relationship Line
Graph 1003
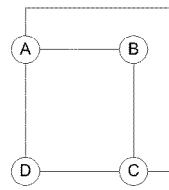
Edges
Corresponding
to Nodes in the
Line Graph
1005
A={2,4}
B={1,2}
C={2,3}
D={3,4}

Link Quality Annotated Graph.

Example link quality
annotated social network
graph
7010

Link Quality Dependent
Digital Value Exchange

Relationship Selection Mechanism. Relationship Selection
Browser Page Elements with Link Quality Rating and Information.
Data Query for Relationship
Quality Example Search
Criteria. Figure 6.
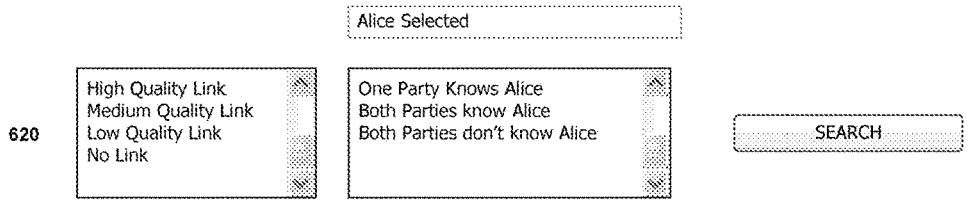
Results List. Figure 7.
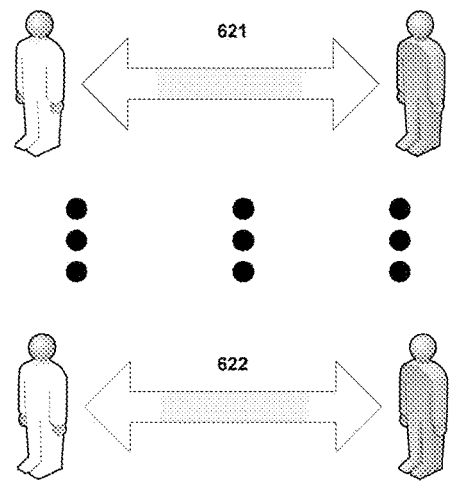
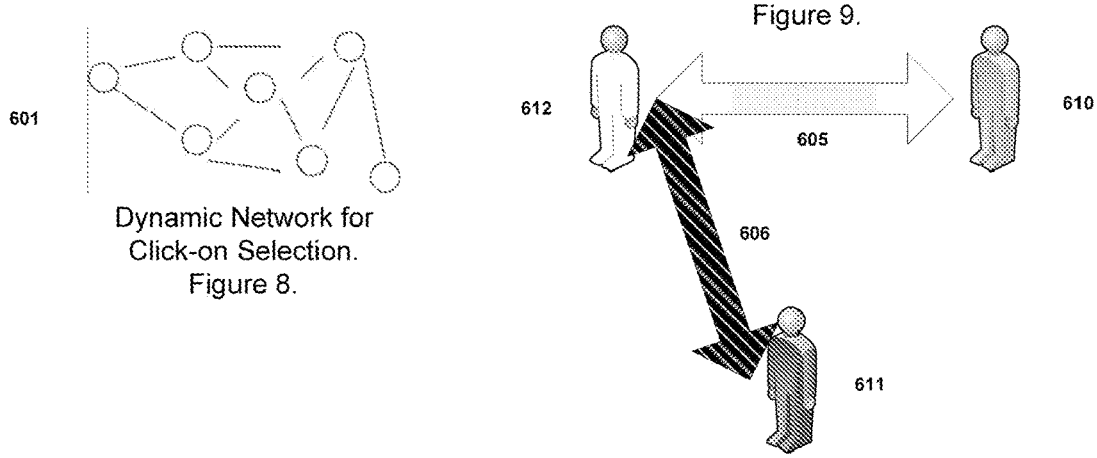
Dynamic Network for
Click-on Selection.
Figure 8.
Clickable Links with
Quality Indication.
Figure 9.

Relationship Network. Business Representative Relationship
Content Browser Page with Link Quality Rating and Information.
Figure 10.

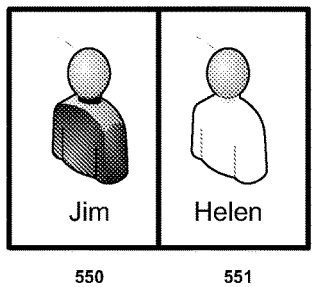

550  551

553 — "Strong Business Connection"

552 —

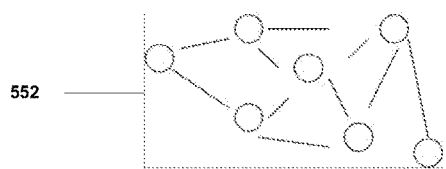

Jim: That was an interesting informational meeting we had yesterday online. It conveyed the essence of what we are trying to accomplish in business.  554

Helen: Yes I found it highly useful to build up our business model. Here is a related news item and a slide show of the meeting.  555

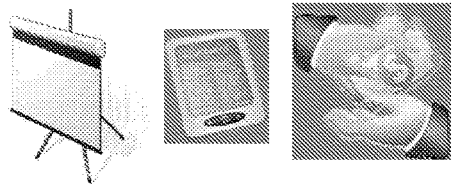  556

June: It was a highly productive meeting since you have a strong business quality link I'd like to connect to Helen to show our creative approach to the business model.  557

Rich: Helen and Jim your relationship has strengthened the strategic alliance between the two companies.

Helen & Jim: Our strategic alliance is great for establishing the new business model.  558

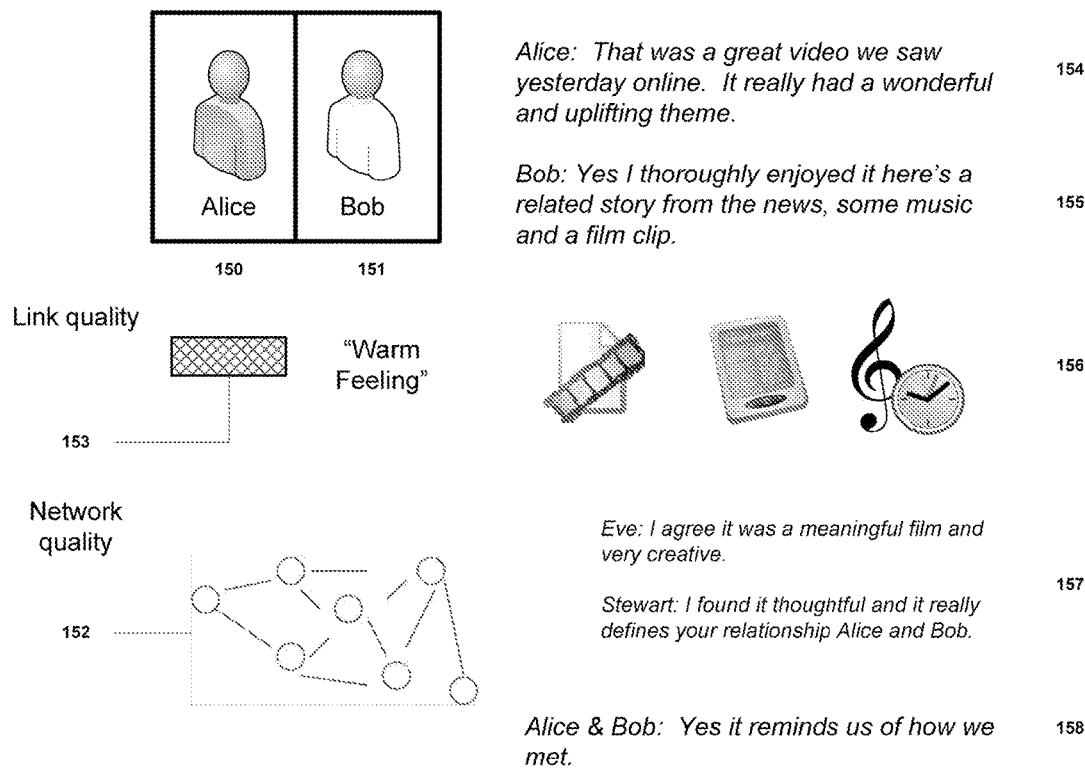

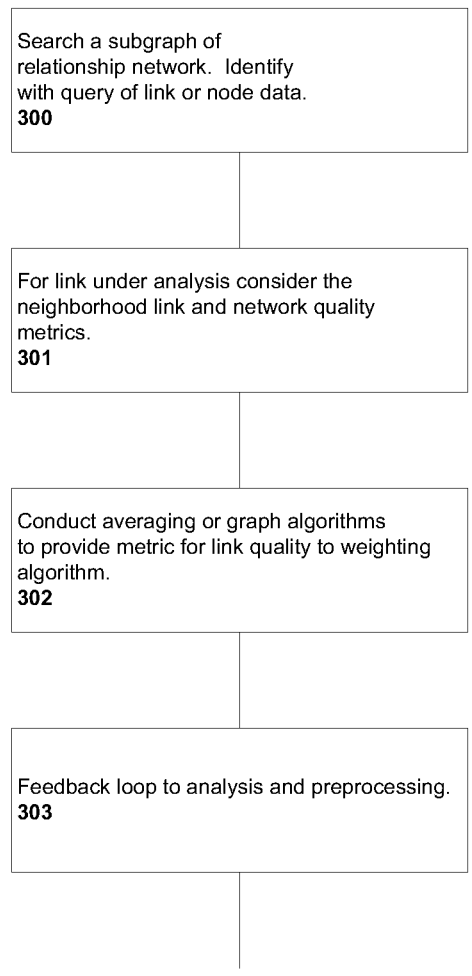
Graph Theoretic Analysis and Preprocessing. For Network and Link Quality Calculation. Figure 12.

Conveyance of Digital Value based on Link Quality and Aggregate Link Quality. Figure 13.
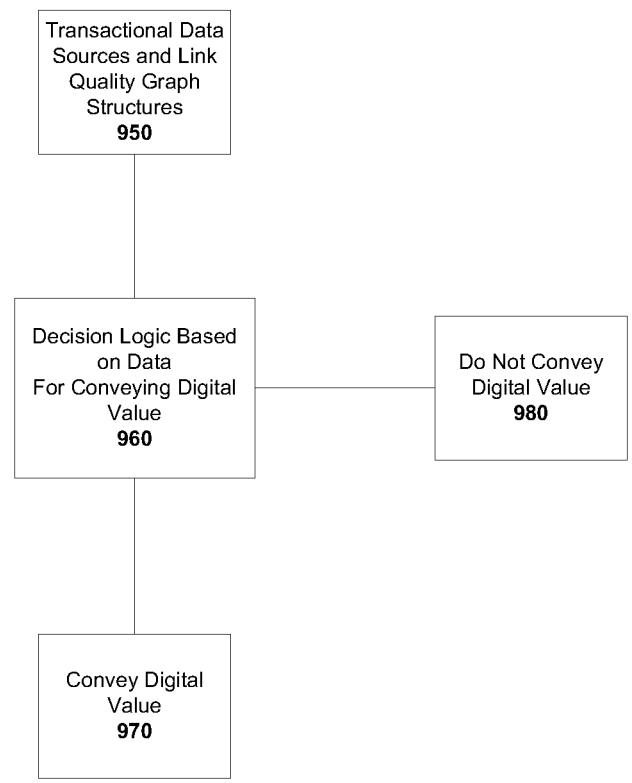

RELATIONSHIP NETWORKS HAVING LINK QUALITY METRICS WITH INFERENCE AND CONCOMITANT DIGITAL VALUE EXCHANGE

RELATED APPLICATIONS

This is a continuation of pending U.S. patent application Ser. No. 14/275,328, filed May 12, 2014, the entire disclosure and drawings of which are hereby incorporated herein by reference, which is a continuation of U.S. patent application Ser. No. 13/177,856, filed Jul. 7, 2011, now U.S. Pat. No. 8,725,796, the entire disclosure and drawings of which are hereby incorporated herein by reference.

TECHNICAL FIELD

The field of the invention generally relates to computer-based social relationship networks, and more particularly to social relationship networks employing embedded information characterizing specific relationships between parties to the network, or social relationship networks employing exchange of digital value.

BACKGROUND

Computer-based social networks such as FACEBOOK, GOOGLE+, PING, or LINKEDIN provide opportunities for individuals to maintain, nurture, and develop relationships with friends or business contacts. These networks typically enable their participants to view profiles of other participants, and to link with other participants with whom a pre-existing actual relationship exists or with whom an actual social or business relationship is desired. Typically, once linked together through a computer-based social network, participants can exchange communications, photographs, or other media content, and can view the identities of persons with whom the other participant has relationships through the social relationship network. The other participant might have strong relationships with some of these persons, and might barely know others.

It is known, in contexts other than computer-based social networks, to provide, to a human player of a computer-based game, information characterizing the attitudes of other non-human "players" toward the human player. The information can include a linguistic description of the other player's attitude toward the human player (friendly, annoyed, etc.) and a set of reasons underlying the other player's attitude. The human player can also look up a simple description of the relationships between the other players.

In the modern context of computer-based social networks, however, it is typically assumed that the participants are themselves aware of the nature of their own relationships with other actual human participants.

In a social network such as FACEBOOK, a profile of a particular person can identify another person to whom the person is married or engaged, etc., along with an anniversary date.

The calculation of link quality metrics in social networks is known in the art. For example, Eberle, U.S. patent application Ser. No. 11/743,866 (Publication No. 2008/0120411) discloses a method for producing a quantitative "scores" of the quality of relationships between the participants of a social network, based on variety of factors.

SUMMARY

In one general aspect, the invention provides a digital social relationship network and a method of operating such a network, in which a social network server computer stores a digital social network representation corresponding to a graph having nodes representing individuals or groups and links representing actual social relationships between the individuals or groups. The server computer obtains relationship-dependent information corresponding to a plurality of links of the graph, and embeds the relationship-dependent information in the digital social network representation stored in the social network server computer. The server computer interactively presents to a user of a client computer connected to the social network server computer a social network of the individuals or groups and the social relationships between the individuals or groups. The social network server computer receives input from the user of the client computer selecting at least one of the social relationships between individuals or groups other than the user, and presents to the user of the client computer a social relationship profile comprising the relationship-dependent information corresponding to the social relationship selected by the user of the client computer.

By interactively presenting the social relationship network to the user such that the user can select a social relationship and thereafter receive a social relationship profile, the invention greatly facilitates the ease with which a person can develop business contacts or engage in personal networking, because the user is armed with important information about how well different people in the computer-based network are actually connected to each other, as well as details that go beyond a quantitative score. For example, the relationship profile can include information about the shared interests or business dealings of the parties to a relationship, and if this information is available to a client user then the client user can rely his or her relationship with the party he or she knows as well as knowledge of the shared interest or business dealings to build a relationship with the party he or she does not know, for business networking or other purposes.

The user's networking abilities can be enhanced, in certain embodiments of the invention, by the network server computer using a shortest path algorithm to identify a pathway within the social network from the user to an individual selected by the user, or the sever computer using a maximum flow algorithm to determine multipath reachability of an individual selected by the user, thereby assisting the user in identifying networking strategies with respect to the individual selected by the user.

Certain embodiments of the invention provide techniques that can assist a user in identifying relationships to examine more closely. For example, at least some of the relationship-dependent information, such as relationship strength information in quantitative or non-quantitative form, may be presented to the user before the user selects one of the social relationships and before the social relationship profile is in turn presented to the user. The step of interactively presenting the social network to the user can include generating a list of relationships in response to a query from the user, or generating a list of potential social relationship partners based on the embedded relationship-dependent information.

Furthermore, the relationship-based information provided by social relationship networks according to the invention can be used to facilitate exchange of digital value to users based on the relationship-dependent information embedded in the digital social network representation stored in the social network server computer. Such digital value can be provided to users based on the strength of their relationships, or based on introductions they have made within the social relationship network, or based on their shared interests, for example. The digital value can be, for example, digital or virtual cash, coupons, tokens, advertising, access to a multiplayer game or game value within such a game, or content having digital rights management, which a user can share within the social relationship network.

Moreover, the relationship-dependent information can be automatically inferred within the social relationship network from a variety of sources, including: monetary exchange transactional metrics, frequency of digital exchange, biometric information, visual cues, parsed linguistic descriptions of exchanges between individuals or groups, geo-location information, game or group participation metrics, gestural or haptic input, location dependence in digital media or photographs between individuals or groups in a relationship with each other, or correlation of routes of travel shared between participants in a relationship with each other (the participants either travelling the routes concurrently or with temporal offset).

In certain embodiments of the invention, the automated inference of the relationship-dependent information can be based on analysis of the neighborhood of the graph a particular link, such as by analyzing degree of interconnectivity within the neighborhood, and privacy access settings can be determined based on this automated inference. In other embodiments of the invention, the overall quality of interconnections of a subset of the graph is assessed, either quantitatively or non-quantitatively, and the server computer initiates exchange of digital value to a user based on the assessment of the overall quality of interconnections of the subset of the graph. In other embodiments of the invention, the quality of interconnections within the social network is assessed based on the embedded relationship-dependent information, and a subset of the graph having high-quality interconnections is identified based on the step of assessing the quality of interconnections within the social network.

In certain embodiments, the relationship-dependent information can be social relationship strength information obtained by receiving like/dislike/rating information for social relationships, the like/dislike/rating information being a like/dislike/rating of the social relationships themselves. In other embodiments, the relationship-dependent information can include a characterization of the personality of the social relationship, which is presented to a user when the user accesses a link to which the relationship-dependent information corresponds. In other embodiments, the relationship-dependent information can be presented to a user when the user accesses a link to which the relationship-dependent information corresponds, in accordance with privacy access settings for the link set by individuals or groups in a social relationship to which the link corresponds.

The social relationship profile can be in the form of a web page corresponding to the social relationship selected by the user of the client computer. The relationship-dependent information can include music, artwork, or written literature, which is presented to the user when the user accesses a link to which the relationship-dependent information corresponds.

The digital social network representation may be stored as the graph of nodes representing individuals or groups, or as a line graph having nodes representing the social relationships between the individuals or groups. The relationship-dependent information embedded in the digital social network representation may be stored in the social network server computer itself or elsewhere.

In another general aspect, the invention provides a digital social relationship network and a method of operating such a network, in which a social network server computer stores a digital social network representation corresponding to a graph having nodes representing individuals or groups and links representing actual social relationships between the individuals or groups. The links of the graph include links representing social relationships between a user of a client computer connected to the network server computer, or a group to which the user of the client computer belongs, and other individuals or groups. The server computer obtains relationship-dependent information corresponding to a plurality of links of the graph, and embeds the relationship-dependent information in the digital social network representation stored in the social network server computer. The server computer facilitates exchange of digital value to the user of the client computer, or a group to which the user of the client computer belongs, based on the relationship-dependent information embedded in the digital social network representation stored in the social network server computer.

The details of various embodiments of the invention are set forth in the accompanying drawings and the description below. Other features and advantages of the invention will be apparent from the description, the drawings, and the claims.

DESCRIPTION OF THE DRAWINGS

FIG. 2 is a flowchart diagram of the steps for embedding relationship-dependent information into a social relationship network representation in accordance with the invention, accompanied by examples of a social relationship graph and social relationship line graph.

FIG. 6 is an image of a data query element of a relationship selection browser page produced in connection with a social relationship network in accordance with the invention.

FIG. 7 is an image of a results list element of a relationship selection browser page produced in response to data query entered in the data query element of FIG. 6.

FIG. 8 is a diagram of a dynamic network display element of a relationship selection browser page produced in connection with a social relationship network in accordance with the invention.

FIG. 9 is a close-up image of a portion of the dynamic network display element of FIG. 8.

FIG. 10 is an image of a relationship profile browser page produced in connection with a business social relationship network in accordance with the invention.

FIG. 11 is an image of a relationship profile browser page produced in connection with a personal social relationship network in accordance with the invention.

FIG. 12 is a flowchart diagram of steps for performing the graph theoretic analysis and preprocessing step shown in FIG. 3.

FIG. 13 is a flowchart diagram detailing the decision analysis forming the digital exchange step shown in FIG. 5.

DETAILED DESCRIPTION

The inventor has developed a social relationship network that automatically infers link quality metrics between its participants and also employs digital value exchange based on these metrics.

The social relationship network employs the mathematical tools of graph theory to characterize the dynamics of individuals and groups. A graph G is defined as an ordered pair (V, E) of a set V of vertices or nodes and a set E of edges, which are two-element subsets of V. A line graph of an undirected graph G is defined as another graph L(G) that represents the adjacencies between edges of G. That is to say, any two vertices of L(G) are adjacent if and only if their corresponding edges in G share a common endpoint ("are adjacent").

Figure 1:
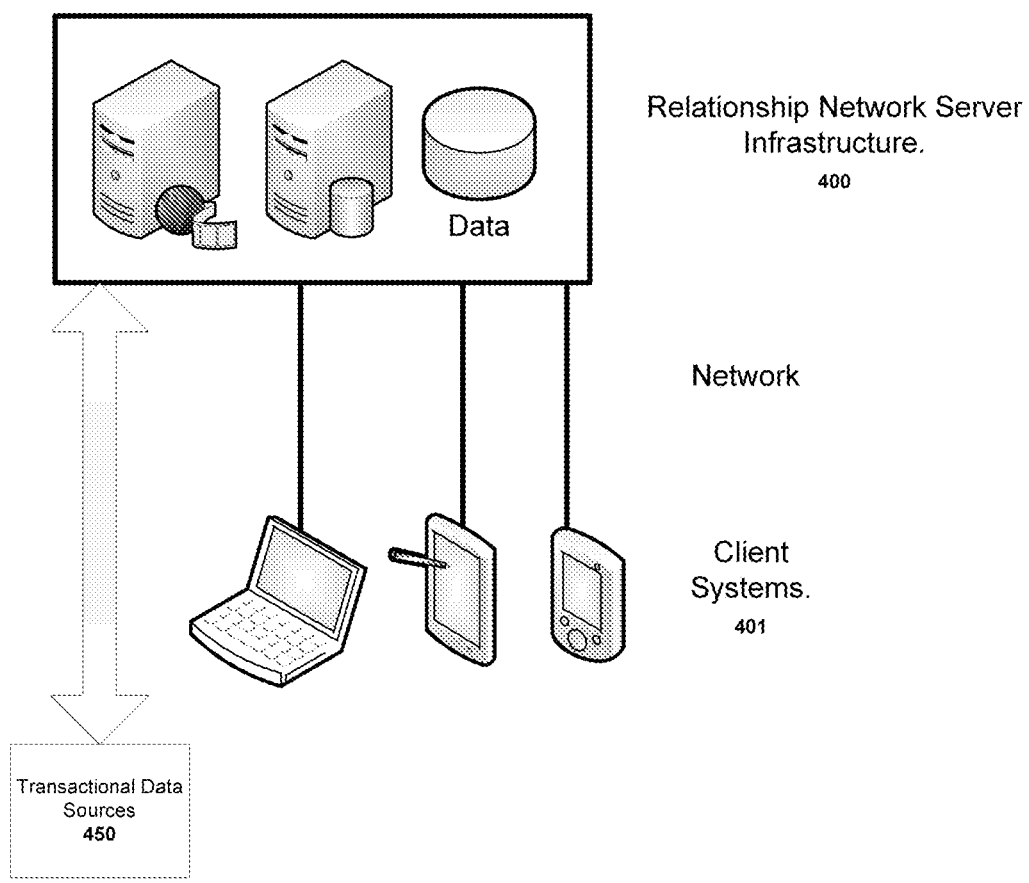
FIG. 1 is a system overview diagram of the components of a social relationship network in accordance with the invention.

With reference to FIG. 1, there is shown an overview diagram of the social relationship network. A relationship network server 400 includes one or more computer processors and data storage devices. Relationship network server 400 is programmed, in accordance with the details described below, to store a representation of the digital social network. The representation of the digital social network corresponds to a graph having nodes representing individuals or groups and links representing actual social relationships between the individuals or groups. Relationship network server 400 is also programmed, in accordance with the details described below, to obtain relationship-dependent information for the links of the graph and to embed this information in the digital social network representation. The relationship network server 400 need not be centralized, but can be distributed on many systems as is known to those skilled in the art.

The digital social network representation stored by relationship network server 400 is a data structure that captures the information contained in the nodes and links of the graph, as well as the embedded relationship-dependent information mentioned above. The social network is modeled in the stored digital social network representation as a graph between participants. Nodes represent participants such as individuals, organizations, or groups, and the links or edges between the nodes represent the connections between the participants. The relationship-dependent information embedded in the digital social network representation includes numerical values for the links of the graph, and thus, the graph is a weighted graph. Social network undirected or directed graphs (as data structure and analysis tool) are known to those skilled in the art.

In alternative embodiments of the invention, the social network is modeled in the stored digital social network representation as a social network based on relationships instead of individuals. The model is established by computing the line graph corresponding to the conventional social network graph. In this model, a relationship is a node in the corresponding line graph. If relationships in a particular social network involve more than two persons per relationship, then the "line graph" model (which applies only to two-party relationships) is extended accordingly to more than the two parties.

Relationship network server 400 is connected through an IP network to client computer systems 401, which include personal computers and smaller computer devices such as mobile tablet computers, smartphones, etc. As is described in more detail below, relationship network server 400 is programmed to interactively present to client computer systems 401 the social network of individuals or groups and the social relationships between the individuals or groups, to receive input from client computer systems 401 selecting social relationships between individuals or groups, and, in response, to present social relationship profiles to client computer subsystems 401. The social relationship profiles include the above-mentioned relationship-dependent information.

With reference to FIG. 2, there is shown a flowchart diagram of the steps for embedding relationship-dependent information into a social relationship network representation, accompanied by examples of a social relationship graph 1001 and a social relationship line graph 1003. The numeric labels in social relationship graph 1001 are placeholders or indices into data or information that the relationship network server causes to be stored with respect to the individual nodes of the graph (corresponding to participants in the social network, which may be individuals, companies, and other affinity organizations). In step 1002 of the flowchart, this standard digital social network representation is stored, including the abovementioned data or information with respect to the various individual nodes, stored at the node level (i.e. nodes 1, 2, 3 and 4 in social relationship graph 1001). In step 1004 (which is optional), this stored digital social network representation is converted to a line graph, such as social relationship line graph 1003, the nodes in line graph 1003 corresponding to edges from graph 1001 as shown in list 1005. The nodes in line graph 1003 are defined by sets of cardinality two, since the links in graph 1001 are undirected. Nevertheless, in a case in which the links in graph 1001 are directed (links corresponding to unidirectional relationships such as links representing fans of a given node, for example), the nodes in line graph 1003 are defined by ordered pairs rather than sets of cardinality two, as is known to those skilled in the art. If optional step 1004 is not performed, the digital social network representation data is left in its original form from step 1002.

In step 1010, relationship-dependent appurtenant information (relationship data) is stored with the edges in social relationship graph 1001 or, if optional step 1004 is performed, with the nodes in social relationship line graph 1003, depending on whether optional step 1004 is performed. A conventional social network corresponding to social relationship graph 1001 contains node-specific data and operates on that data as is known to those skilled in the art. A network corresponding to social relationship line graph 1003 operates in analogous terms on individual relationships in the network, with the functionality of existing social network facilitation tools (such as FACEBOOK, LINKEDIN, PING, and GOOGLE+). The system culminates in step 1020 with a digital representation of the social relationship network, embedded with the relationship-dependent information.

Figure 3:
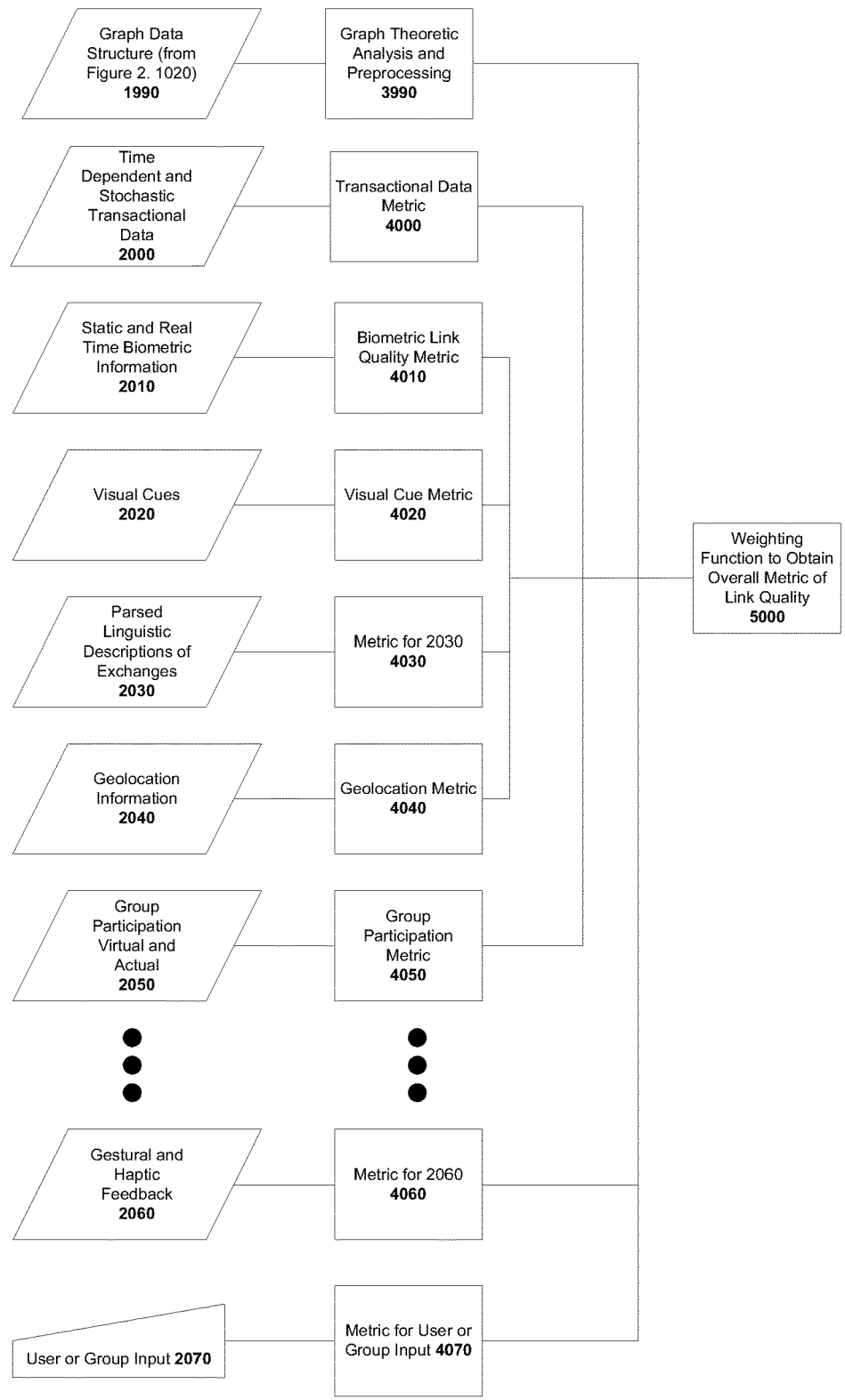
FIG. 3 is a graphical diagram of the steps for inferring link quality metrics in accordance with the invention.

The quality of interactions among participants of the social network is highly subjective and interpersonally defined. Nevertheless, the relationship network server employs mechanisms for inferring the quality of the connection between nodes in a meaningful quantitative or linguistic way, thereby providing a tool useful for follow-on exchange of digital value based on the inferred quality as well as for other purposes. With reference to FIG. 3, there is shown a flowchart illustrating the inference process for the link quality metric performed by the relationship network server. A variety of data sources participate in the determination of link quality metrics. Accordingly, in various embodiments of the invention, this inference is based upon metrics associated with time-dependent and stochastic transactional data 2000 such as virtual or real monetary exchanges between the network participants (including frequency of digital exchanges, which can be obtained by linking to PAYPAL information and the like), biometric information 2010, visual cues 2020 such as facial expressions and micro expressions (which can be obtained from video calls and chats) or proximity of the participants to each other in photographs and other visual media stored in the participants' own databases (based on facial recognition technology), linguistic parsing and analysis of exchanges between the participants 2030, geo-location information 2040 (such as proximity of location information between the network participants and common time-dependent routes followed by the network participants), participation in group or individual games (or virtual worlds) 2050, gestural or haptic input 2060 (such as typing rhythm), direct user or group input (such as "like," "dislike" or other ratings of the relationship itself, provided by the participants in the relationship themselves or by other participants of the network), and metrics associated with analysis of the graph data structure 1990, such as analysis of the degree of interconnectivity of the network in the neighborhood of the link under analysis (discussed below in connection with FIG. 12). Thus, a very broad range of inputs is collected and calculated for link quality establishment.

More specifically, data 1990 pertaining to the graph structure is processed through graph theoretical analysis and preprocessing step 3990 (detailed in FIG. 12 in the case of analyzing interconnectivity of a neighborhood) to obtain a value for the link quality for that input stream. In calculating the link quality value, for example, aggregate weightings of cliques can be used or k-vertex connectivity in the social network can be used. In addition, time-dependent and stochastic transaction data 2000 (data that is continually being updated by data sources) are analyzed. These data may pertain to the graph structure itself (i.e. frequency of edge deletes and adds between nodes) or can be extrinsic virtual or real financial transactions. Stochastic analysis determines the degree to which the transactional data between two nodes deviates from the universe of a known set of typical transactions. The degree of typicality is captured in a value that is used to form an intermediate transactional data metric 4000. If the transactional data 2000 pertains to financial transactions, than a low transactional data metric would correspond to low economic activity between the two nodes. If one of the nodes represents a charitable organization, then a history of making monetary donations to the charitable organization would warrant a high transactional data metric for the relationship between the donor and the charitable organization.

Concurrent collection of biometric data 2010 by biometric means for the participants in the social network yields a degree of correlation for input to the establishment of a biometric link quality metric 4010. An example of biometric time series is galvanic skin response (GSR), electrodermal response (EDR), psychogalvanic reflex (PGR), skin conductance response (SCR) or skin conductance level (SCL). Other types of biometric collection of response can be conducted as known to those skilled in the art such as electroencephalogram, magnetoencephalogram, electrocardiogram, electromyogram, and heart rate variability (for example, Tan et al., U.S. Patent Application Publication 2007/0185697 describes the use of electroencephalograph signals for task classification and activity recognition). The time series of the response is correlated to determine similarity of responses to like stimuli to form the biometric link quality metric 4010. Also included in the input data sets are visual cues 2020, adapted from image processing. Proximity in photos, decoded expressions (with participants being identified by facial recognition technology), decoded time-dependent expressions (i.e. micro expressions from visual chats), and decoded body language form the basis of the visual cue metric 4020. Parsed linguistic descriptions of exchanges 2030 are data pertaining to email messages exchanged between participants, audio files, multimedia files, documents in a shared workflow, or comments shared in a social network data field. The linguistic data contains semantic content that is parsed and analyzed for keywords, shared world view and ideas. The degree to which participants share semantic content is summarized in a metric pertaining to this area of exchange 4030. Geo-location information 2040 can be time dependent as well and plays a role in the establishment of the degree to which parties share common time dependent routes and locations, to establish a metric 4040 based on time-stamped geo-location information. Recorded group participation data 2050 includes time-dependent join and leave operations, including participation in games and group activities as well. Metric 4050 is based on group activities and takes into account mutual group membership. Moreover, overall link quality metrics for a group are used in aggregate (in a manner analogous to the steps shown in FIG. 12, discussed below) to obtain a weighting for the degree of interconnectedness of that group. This information is used to obtain the group weighting 4050 as it pertains to individual link quality. Gestural and haptic feedback 2060, digitized from virtual games or even visual cues as well, is captured as it pertains to the relationship link quality in a metric 4060.

User input data 2070 is obtained from a "like" button, or an input mechanism that accepts a gradation of possible values for degree of "like/dislike" values, or a rating system that allows members of a given community (nodes in the social network graph) to rate directly a given relationship between two parties or nodes in the relationship graph. User input data 2070 can also be obtained from the frequency of comments from third parties about the relationship on a relationship profile page (described below in connection with FIGS. 7 and 8). Extrinsic and intrinsic ratings of link quality (by the participants to the relationship and by third parties, respectively) are captured in the data 2070, which is used to obtain metric 4070. Metric 4070 can include a multi-dimensional assessment of the relationship similar to a Myers Briggs assessment of personalities of individuals (characterizing the relationship as being an introverted or extroverted relationship, for example). This kind of information can be very useful to people who wish to develop networking strategies using the social relationship network, or to advertisers.

Ellipses are shown in FIG. 2 to indicate that other input sources of data can be used. For example, the relationship network server can conduct searches through search engines for source material or data directly related to the relationship (such as articles in which a person's name occurs in "proximity" to another person's name), and this source of data could be used as a measure of link quality. Privacy settings set by the parties to the relationship, and psychological factors as indicated by online behavior can also be used to infer the quality of the link. Link quality can also be inferred from data such as rate of change of links by a particular network participant, including, adds, deletes, and modifications of privacy restriction.

All metrics are passed to weighting function 5000, which calculates an overall link quality metric. The weighting function is any of a number of classification technologies known to those skilled in the art. For example, a support vector machine (SVM) or a Bayes Classifier can be used where the link metric is a discrete set of values. Both probabilistic classifiers and non-probabilistic classifiers can be used. In certain embodiments of the invention, the metric, as stated before, is nonnumeric and linguistic in lieu of a quantitative measure.

The steps shown in FIG. 3 are iterated for all links in the graph, or nodes in the line graph. At the end of this process a link quality metric has been established at weighting function 5000 for each graph link or line graph node. After processing at weighting function 5000 for all links in the network, a link-quality annotated social network graph is obtained. The feedback of link quality now is available for the social graph.

Figure 4:
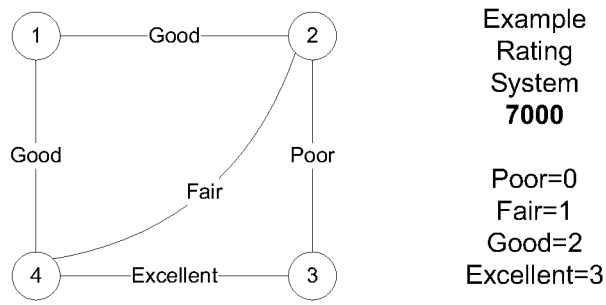
FIG. 4 is a diagram of a social network graph annotated with link quality information in accordance with the invention.

With Reference to FIG. 4, there is shown a simple example of a link-quality annotated graph 7010. Graph 7010 is undirected; however, it is a simple matter to show links as a directed graph, as is discussed above. An example rating system 7000 for the social network graph includes numeric values, but the actual annotations can be non-numeric values that give insight into the link quality of a connection. Hence the weightings associated with graph edges and nodes can be linguistic in nature and not just numbers and factors.

With reference to FIG. 12, there is shown a flowchart diagram of the steps for performing graph theoretic analysis and preprocessing for a subset of the graph, which steps collectively form step 3990 of FIG. 3 with respect to a particular link under analysis. In the process of FIG. 12, an overall quality of the interconnections of a graph is derived for a subset of the graph (such as a neighborhood of the particular link under analysis in FIG. 3), based on the individual relationships and their quality within the subset of the graph. First, a subgraph of the relationship network is identified and searched based on a query of link or node data (step 300). For the particular link under analysis, the link and network quality metrics for the identified subgraph are obtained (step 301), and these quality metrics are averaged or processed through a graph algorithm to provide a single metric for the particular link under analysis (step 302), which is forwarded to the overall weighting function (block 5000 in FIG. 3) that combines this metric with all other metrics for the particular link under analysis. A feedback loop (step 303) causes steps 300-302 to be repeated for other links to be analyzed.

Aggregating link quality information produces a picture of the degree of connectedness beyond traditional graph theoretical k-vertex-connectedness measures (k being the smallest number of vertices that can be deleted from a subset of the graph to cause the subset of the graph to become disconnected). Weightings of connectedness due to number of unique elements of data shared, for example, provide a metric that can determine to a greater extent the degree to which groups of nodes (and the people they represent) are connected to each other and share common relationship data. Clustering coefficients (measures of the degree to which the nodes in the subset are clustered together) can be used as part of the assessment of aggregate link quality for the subset. The information provided by the overall metric for the subset of the graph benefits targeted marketing and advertising to the group defined by the subset of the graph, and benefits other types of digital value exchange. In certain embodiments of the invention the overall quality of the subset is relied upon to facilitate or deny access to further digital value exchange for that subset.

Identification of subsets can be by means of standard database query mechanisms (such as keywords associated with nodes or links, or queries concerning a company for whom all participants of the subset work). Standard logic applies for selection of the subsets. One means of subset identification can be connectivity and link quality (in other words, select a subset with good link quality).

The link quality metric produced by the inference processes of FIGS. 3 and 9 is quantitative in some embodiments of the invention, and in other embodiments the metric contains non-numeric, linguistic, cultural, or multimedia descriptions in lieu of or in addition to quantitative scores. Moreover, a link of the graph can also define items of interest that transcend a mere Venn-diagram intersection of shared interests. For example, as will be discussed in more detail below, the relationship-dependent information embedded in the digital social relationship network representation can include "likes" and "dislikes" for a relationship itself, provided by the participants in the relationship themselves or by other participants of the social network. Other embedded definitional descriptors of the relationship itself can include likes/dislikes (for activities or forms of entertainment, etc.). Other forms of embedded definitional descriptors include actual music files, visual artwork files, poetry, multimedia content, and cultural content, attached to a graph link that defines a relationship in the social network, or attached to a corresponding node in the line graph corresponding to the graph. Thus, the social network is defined by the relationships and not just by the individual participants. Furthermore, the information described above can be input to the establishment of a link or relationship quality metric in the process described above in connection with FIG. 3. Those metrics, whether in aggregate for a subgraph or individually on a link, can be used to conditionally allow digital exchange in the network as is described below.

The relationship network server interacts with the client computer systems to enable privacy settings to be set by the participants to a relationship, and in certain embodiments of the invention these privacy settings can be inferred from the link quality metrics. Thus, the privacy setting can be set so that the shared content described above is private to the participants to the relationship and not shared (in an extreme case, the participants would have to log in together to view the shared content), or so that it can be shared with others (including specific privacy settings for specific categories of relationships such as social friends, business contacts, etc.). Furthermore, in certain embodiments of the invention this shared content or relationship appurtenant data is analyzed as part of the process of inferring link quality metrics shown in FIG. 3.

As was mentioned above, in certain embodiments of the invention the social network is modeled in the stored digital social network representation as a social network based on relationships instead of individuals, by computing the line graph corresponding to the conventional social network graph, a relationship being a node in the corresponding line graph. In these embodiments, the quality metrics discussed above can be established either for nodes (relationships) in the line graph, or in a somewhat analogous manner for the links in the line graph (in which case the quality metric is for the link between relationships in the line graph). In this document when graph quality and link quality metrics, and follow-on digital value exchange activities are discussed, these discussions shall apply equally to this social network of relationships context as well.

In operation of the social relationship network, the relationship network server 400 of FIG. 1 interacts with client computer systems 401 to receive queries from users of the client computers and, in response thereto, to present "results" to the client computers in the form of suggested relationship links or in the form of a dynamic, interactive display of a portion of the social relationship network. In particular, with reference to FIG. 6, there is shown an example of a data query element 620 of a relationship selection browser page that appears at one of the client computer systems. In this example, the user has a strong relationship with Alice and wishes to identify persons he or she can reach through his relationship with Alice. The user selects Alice in a selection box and chooses, from another selection box, to search for relationships in which "one party knows Alice," "both parties know Alice," or "both parties don't know Alice." In another selection box, the user chooses to search for relationships in which the parties to the relationship have a "high quality link," "medium quality link," "low quality link," or "no link." In other embodiments of the invention, other types of pre-selection are used in place of what is shown in FIG. 6: For example, the client user can search an individual, to find out about that person's relationships, or, the client user can start at the user and expand outward, or the client user could enter a query for type of individual, or a certain type of relationship the client user is interested in.

In one embodiment of the invention, the query entered in connection with FIG. 6 produces a results list as shown in FIG. 7, transmitted from the relationship network server to the client computer system. Each result 621-622 represents a relationship link between participants in the social relationship network. Differences in coloring or shading of the relationship links in the results list can represent different quality metrics for the respective links. The links in the results list are "clickable," such that a user can select a link and receive in response from the relationship network server a profile page for the relationship (discussed below in connection with FIGS. 10 and 11). The images of the participants in the results list are also "clickable," such that the user can also receive traditional profile pages corresponding to individual participants of the network.

In another embodiment of the invention, the query entered in connection with FIG. 6 produces a dynamic network display 601 as shown in FIG. 8, transmitted from the relationship network server to the client computer system. The dynamic network display shows nodes representing participants in the network, and relationship links identical to those shown in FIG. 7. Thus, only relationship links responsive to the query are shown. This dynamic display is "clickable," such that by selecting a link a user receives a profile page for the relationship in response. The nodes are also "clickable" such that the user can also receive traditional profile pages corresponding to the nodes. Vertical and horizontal scroll bars, zoom features, and re-centering features allow the user to explore portions of the network beyond the portion initially shown to the user. The client user can explore the network through dynamic network display in a manner similar to a visual thesaurus. Only relationship links exceeding a client-selectable quality metric (which may pop up on the browser page as a query) are included in dynamic network display 601.

In other embodiments of the invention, the dynamic network display of FIG. 8 is presented to the user of the client computer system without the user first entering a query to search for relationships. Rather, the dynamic network display is either centered around a node representing the user, or centered around a node representing a specific participant selected by the user. The user explores the dynamic network display using scroll bars and zoom features.

With reference to FIG. 9, there is shown a close-up image of a portion of the dynamic network display element of FIG. 8. Differences in coloring or shading of relationship links 605 and 606 represent different quality metrics for the links between participants 612 and 610 and between participants 612 and 611 respectively.

With reference to FIG. 10, there is shown a relationship profile browser page for a business relationship, either in the context of an entirely business-based social relationship network, or a more general social relationship network that includes different categories of relationships (business, personal, etc.) The relationship server computer transmits the relationship profile to the client computer system when a client user selects, by clicking, one of the relationship links in one of FIGS. 7-9. Participant identifiers 550 and 551 identify the parties to the relationship being profiled. Dynamic network display 552, which is analogous to dynamic network display 601 in FIG. 8, displays a portion of the social relationship network in the neighborhood of the relationship link that corresponds to the profile, and includes "clickable" nodes and links. Only relationship links exceeding a client-selectable quality metric are included in dynamic network display 552. Quality of relationship display 553 provides an indication of the quality of the profiled link, either automatically inferred according to the method discussed above, or based on direct input from participants in the network.

Included in the profile page are: individual postings 554 and 555 by the participants to the relationship; presentations (such as slide shows) news items, and transactional content (such as PAYPAL or EBAY transactions) 556; third-party postings 557; and joint postings by the participants 558 (as a tandem blog in which individuals and groups can make joint postings). The participants to the relationship and third parties can enter the postings directly into the relationship profile. The participant and third-party postings can also be auto-generated: Unless messages are flagged as private, they are automatically posted on the relationship page. This auto-generation can be performed by a plug-in app applied to a known social relationship network such as FACEBOOK. The plug-in app could have conventional FACEBOOK privacy settings, but could also create privacy settings for the relationship profile page too (as to who may view it, what kind of content can be generated automatically, and what kind of content would not be allowed on the profile page, etc.).

With reference to FIG. 11, there is shown a relationship profile browser page for a personal relationship, which is transmitted to the client computer in the same manner as the business relationship profile of FIG. 10 and which functions in the same manner. The personal relationship profile includes participant identifiers 150 and 151, dynamic network display 152, quality of relationship display 153, individual postings 154 and 155 by the participants to the relationship; multimedia content, news items, and music files 156; third-party postings 157; and joint postings by the participants 158; all of which function in a manner analogous to their counterparts in the business relationship profile of FIG. 10.

One novel use of the link quality information is to conditionally establish follow-on digital exchange inclusive of digital cash and advertising based on the link quality information. Thus, in certain embodiments of the invention, calculations of graph theoretical link quality metrics are followed by concomitant and conditional digital value exchange in the network. For example, digital value exchange can be digital or virtual cash, advertising, enhanced advertising watermarked with digital cash as described in U.S. patent application Ser. No. 11/898,887, tokens, coupons, PAYPAL payments, access to a multiplayer game, game value within such a game, enhanced social status within such a game, music or media content with or without digital rights management, auction credits, EBAY payments, promotions, bank transfers, differential pricing, salary bonus structures, or other exchanged values. In certain embodiments of the invention, participants of the network are remunerated directly for having high quality links and for making successful introductions through the network to other network participants (perhaps at a charge). This remuneration can be analogized in one instantiation to sharing of profits of INMAIL for LINKEDIN. Because the measurable quality of relationship links becomes a valuable commodity, participants in the social relationship network can be remunerated by corporations for whom they work for producing good relationship links (especially for important clients of the corporation) or for producing a subset neighborhood of the social relationship network having good aggregate connectivity (as in the case of business managers being rewarded for building good "teams"). Also, participants of the social relationship network can be remunerated by third parties for providing introductions through the network.

Figure 5:
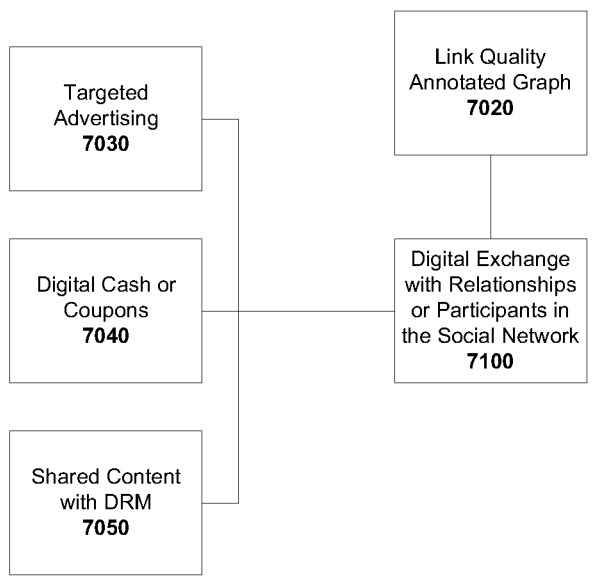
FIG. 5 is a graphical diagram of the steps for digital value exchange based on embedded relationship-dependent information within a social relationship network in accordance with the invention.

With reference to FIG. 5, there is shown a diagram of the steps for digital value exchange. In particular, the link quality or specific content of the relationship data, from link quality annotated graph 7020, is used as the basis for targeting advertising 7030, digital cash or coupons 7040, shared content with digital rights management 7050 such as music and multimedia, and other forms of digital value exchange such as music and multimedia without digital rights management. In certain embodiments, advertising 7030 is targeted using the criteria that the relationship between two parties meets certain thresholds of quality.

Specific examples of digital exchange and the like include: discounted blocks of tickets to a concert; pairs of tickets or coupons in connection with a dating network; "calls for action" in a political activism network. In each of these examples the exchange is dependent not only on the degree of connectedness but also on the specific nature of the shared interests (such as shared interest in a specific music group or shared interest in a political cause).

In other embodiments, digital cash, coupons, or virtual currency 7040 is sent to groups and individuals that share strong relationships (high link quality metrics). Shared content 7050 such as games and applications are provided to network participants, in certain embodiments, subject to the network, a subset of the network, or individual links in the network having sufficient link quality to merit sharing of the information. The digital rights management of shared content 7050 can be relaxed to allow location-dependent, time-dependent, or relationship-dependent use of the shared content. Thus, the digital value exchange process enables conditional sharing of content based on the link quality metric. For example, songs and paid content are shared contingent upon a high aggregate link quality of a subset of the network or contingent upon high individual link quality, and, in certain embodiments, also contingent upon shared interest in a particular kind of music. In step 7100, the digital exchange items are conveyed to the participants in the network dependent upon the link quality metrics, and dependent upon shared interests of the parties to relationships. With reference to FIG. 13, there is shown a flowchart diagram of the steps that comprise step 7100 of FIG. 5. In particular, transactional data sources and link quality graph structures 950 are analyzed in step 960 based on decision logic for conveying digital value. This decision logic, in various embodiments of the invention, is based on thresholds, database queries, set logic, graph reachability, shortest path weightings, or weighted link graph neighborhood analysis. Based on the analysis of step 960, digital value is conveyed (step 970) or not conveyed (step 980).

In certain embodiments, the digital exchange facilitates e-commerce transactions between participants in the social network, yielding commercial exchange between members of the social network and relationships in the network. The quality metrics can be used to enhance marketing of products and advertising (with respect, for example, to friendship-dependent products such as multi-player games that depend on the relationships). Quality metrics are also used in virtual economy or games to earn items of value (for example, the strength of a coalition could be adjudicated as a factor in winning a game against another team in competition for monetary rewards). The overall quality of the network metrics helps marketers to target their ads. Graph analysis of a group of people can indicate health of the group or affiliation, through determining the degree of interconnectedness of the group. Quality metrics can also be used to determine access control and privacy settings of information on the social network: High-quality subnetworks could have more sharing of information than subnetworks that do not have high-quality metrics. Similarly, relationships that have low quality metrics presumably would be protected by privacy access settings to avoid broadcasting the fact that a particular relationship is poor. These privacy access settings can be set by individual users, and also automatically by the relationship network server. For example, circles of privacy and access can be determined automatically or with some user input through graph connectedness and link quality metrics.

The link quality metrics provided by the invention are also useful for many other purposes other than forming the basis for exchange of digital value. For example, the information in the link quality metrics can be used as the basis for automated suggesting of "friends" to a client user of the social relationship network, based on the quality of the links between the client user and other participants and the quality of the links between the other participants and the suggested "friends." In certain embodiments, rather than suggesting "friends" to the user for acceptance of decline, a list of "friends" can be auto-generated and the client user can be automatically connected with the list of "friends," based on the link quality metrics. Alternatively, such an automatically generated list can be relied upon by the client user to select participation in events and to determine whether another participant can read postings under privacy access settings established by the user.

The link quality metrics can alternatively be used to identify the degree of multipath reachability of another network participant identified by the client user, according to the known "maximum flow algorithm" (if high link weighting numbers represent relatively good links). Multipath reachability as calculated by maximum flow algorithm provides a way of identifying the reachability of designated persons in the social relationship network. While the maximum flow algorithm does not generate the best/shortest path to an individual as does the following, it does provide a metric describing the reachability over multiple paths simultaneously. This is useful in determining the degree of simultaneous connection over multiple paths—"multipath reachability."

The link quality metrics can also be used to identify the best path for reaching a specific individual through the social relationship network identified by the client user, according to the known "shortest path algorithm" (if low metric numbers represent good links). The ranking of shortest paths can produce a priority list of the best ways to access an individual in the social network.

In addition, the link quality metrics can be used to determine the "trustedness" of a subset of the social relationship network, when combined with known graph analysis. Members of the subset with stronger links can be rewarded, with monetary rewards or incentives, for introducing other members of the subset to each other, and for nurturing the link quality of weaker links within the subset, to improve the "trustedness" of the subset.

The inventor has described a network in which relationships have increased import over existing social network infrastructure. In one implementation, relationships are elevated to nodal status in the graph representation and detailed content is stored and retrieved regarding the relationships themselves. While several particular forms of the invention have been illustrated and described, it will be apparent that various modifications and combinations of the invention detailed in the text and drawings can be made without departing from the spirit and scope of the invention. For example, the relationship network server and client computer systems configuration of FIG. 1 could be replaced by a distributed peer-to-peer computation and storage system in which the tasks performed by the relationship network server of FIG. 1 are instead performed in a distributed manner by client computer systems themselves throughout the entire system. Also, references to specific flowchart steps or specific browser pages and the elements thereof are also not intended to be limiting in any manner and other steps and elements could be substituted while remaining within the spirit and scope of the invention. Accordingly, it is not intended that the invention be limited, except as by the appended claims.

What is claimed is:

1. A method of operating a digital social relationship network, comprising the steps of:
    storing in a social network server computer a digital social network representation corresponding to a graph having nodes representing individuals or groups and links representing actual social relationships between the individuals or groups, the links of the graph including links representing social relationships between a user of a client computer connected to the network server computer, or a group to which the user of the client computer belongs, and other individuals or groups;
    obtaining relationship-dependent information corresponding to a plurality of links of the graph, and performing automated inference of link quality metrics based on analysis of neighborhoods of the graph;
    embedding the relationship-dependent information in the digital social network representation stored in the social network server computer;
    enabling digital social networking between the user of the client computer and the other individuals or groups, including presenting to the user of the client computer a user-viewable display of at least some of the relationship-dependent information corresponding to links of the graph representing social relationships between the user of the client computer and the other individuals or groups; and
    facilitating, using the network server computer, exchange of digital value to the user of the client computer, or a group to which the user of the client computer belongs, based on a value of at least one of the link quality metrics automatically inferred based on analysis of the neighborhoods of the graph.

2. A method in accordance with claim 1 wherein the link quality metric based upon which the exchange of digital value is facilitated is social relationship strength.

3. A method in accordance with claim 2 wherein the social relationship strength is obtained by receiving like/dislike/rating information for social relationships represented by the plurality of links, the like/dislike/rating information being a like/dislike/rating of the social relationships themselves.

4. A method in accordance with claim 1 wherein the link quality metric based upon which the exchange of digital value is facilitated measures introductions made by the user of the client computer, or a group to which the user of the client computer belongs, within the social network.

5. A method in accordance with claim 1 wherein the digital value is content protectable by digital rights management.

6. A method in accordance with claim 1 further comprising enabling the content protectable by digital rights management to be shared between the user of the client computer and the other individuals or groups with whom the user of the client computer has the social relationships.

7. A method in accordance with claim 1 wherein the analysis of neighborhoods of the graph comprises analysis of degree of interconnectivity within the neighborhoods.

8. A method in accordance with claim 1 further comprising determining privacy access settings based on the automated inference of the link quality metrics.

9. A method in accordance with claim 1 wherein the automated inference of the link quality metrics is based on location dependence in visual media between individuals or groups in a relationship with each other.

10. A method in accordance with claim 1 wherein the automated inference of the relationship-dependent information is based on correlation of routes of travel shared between individuals or groups in a relationship with each other.

11. A method in accordance with claim 1 wherein the link quality metric based upon which the exchange of digital value is facilitated is a metric of overall quality of interconnections for the neighborhood of the graph.

12. A method in accordance with claim 1 wherein the link quality metric based upon which the exchange of digital value is facilitated is a link quality metric automatically inferred for quality of interconnections of a neighborhood of the graph comprising the user of the client computer, or a group to which the user of the client computer belongs.

13. A method in accordance with claim 1 wherein the neighborhoods of the graph are identified based on a query of link or node data.

14. A method in accordance with claim 13 wherein the query of link or node data is a query mechanism that uses keywords associated with links or nodes of the graph.

15. A method in accordance with claim 13 wherein the query of link or node data is a query concerning a company for which all participants of the neighborhood work.

16. A method in accordance with claim 1 wherein the neighborhoods of the graph are identified based on connectivity, such that the step of identifying neighborhoods comprises selecting neighborhoods having good link quality within the neighborhoods.

17. A method in accordance with claim 1 wherein the analysis of neighborhoods of the graph comprises analysis of k-vertex connectivity.

18. A method in accordance with claim 1 wherein the analysis of the neighborhoods of the graph comprises:
obtaining quality metrics for the neighborhood; and
averaging, aggregating, or processing the quality metrics for the neighborhood through a graph algorithm to provide an overall quality metric for the neighborhood.

19. A method in accordance with claim 18 wherein the overall quality metric for the neighborhood provided by the graph algorithm is combined with other metrics by a weighting function.

20. A method in accordance with claim 18 wherein the step of averaging, aggregating, or processing the quality metrics produces a measure of a degree of connectedness of the neighborhood beyond traditional graph theoretical k-vertex-connectedness measures.

21. A method in accordance with claim 18 wherein the quality metrics for the neighborhood comprise weightings of connectedness due to how many unique elements of data are shared within the neighborhood.

22. A method in accordance with claim 1 wherein the link quality metrics measure a degree to which groups of the nodes, and the individuals or groups they represent, are connected to each other and share common relationship data.

23. A method in accordance with claim 1 wherein the analysis of neighborhoods of the graph comprises determining clustering coefficients that measure a degree to which the nodes in the neighborhood are clustered together.

24. A method in accordance with claim 1 wherein In calculating the link quality value, for example, aggregate weightings of cliques can be used or k-vertex connectivity in the social network can be used.

25. A method in accordance with claim 1 further comprising denying, using the network server computer, exchange of digital value to the user of the client computer, or a group to which the user of the client computer belongs, based on a value of at least one of the link quality metrics automatically inferred in connection with the digital social network representation stored in the social network server computer.

26. A method in accordance with claim 1 wherein the exchange of digital value comprises targeted marketing or advertising to a group defined by the neighborhood of the graph.

27. A method in accordance with claim 1 wherein the exchange of digital value comprises remuneration of the user of the client computer for producing a neighborhood of the graph having good aggregate connectivity.

28. A method in accordance with claim 1 wherein the exchange of digital value comprises shared content provided to individuals or groups within a neighborhood having sufficient link quality to merit sharing of the shared content.

29. A method in accordance with claim 28 wherein the shared content comprises a game.

30. A method in accordance with claim 28 wherein the shared content comprises a computer application.

31. A method in accordance with claim 1 wherein the shared content comprises music.

32. A method in accordance with claim 31 wherein the music is provided to individuals or groups within a neighborhood having shared interest in a particular kind of music.

33. A method in accordance with claim 1 wherein the automated inference of link quality metrics based on analysis of the neighborhoods of the graph comprises determining trustedness of the neighborhoods of the graph.

34. A method in accordance with claim 33 wherein the exchange of digital value to the user of the client computer comprises a reward for introducing individuals within one of the neighborhoods of the graph to one another or nurturing link quality within the neighborhood.

35. A method in accordance with claim 1 wherein the social network server computer is decentralized and distributed on many systems.

36. A social network server computer for operating a digital social relationship network, the social network server computer being programmed:
to store in the social network server computer a digital social network representation corresponding to a graph having nodes representing individuals or groups and links representing actual social relationships between the individuals or groups, the links of the graph including links representing social relationships between a user of a client computer connected to the network server computer, or a group to which the user of the client computer belongs, and other individuals or groups;
to obtain relationship-dependent information corresponding to a plurality of links of the graph, and to perform automated inference of link quality metrics based on analysis of neighborhoods of the graph;
to embed the relationship-dependent information in the digital social network representation stored in the social network server computer;
to enable digital social networking between the user of the client computer and the other individuals or groups, including presenting to the user of the client computer a user-viewable display of at least some of the relationship-dependent information corresponding to links of the graph representing social relationships between the user of the client computer and the other individuals or groups; and
to facilitate, using the network server computer, exchange of digital value to the user of the client computer, or a group to which the user of the client computer belongs, based on a value of at least one of the link quality metrics automatically inferred based on analysis of the neighborhoods of the graph.

* * * * *